United States Patent
Fox, Jr.

(10) Patent No.: US 12,448,131 B2
(45) Date of Patent: Oct. 21, 2025

(54) PARACHUTE SLIDER REEFING SYSTEMS AND METHODS

(71) Applicant: Roy L. Fox, Jr., Yuma, AZ (US)

(72) Inventor: Roy L. Fox, Jr., Yuma, AZ (US)

(*) Notice: Subject to any disclaimer, the term of this patent is extended or adjusted under 35 U.S.C. 154(b) by 0 days.

(21) Appl. No.: 19/029,823

(22) Filed: Jan. 17, 2025

(65) Prior Publication Data
US 2025/0242927 A1    Jul. 31, 2025

Related U.S. Application Data

(60) Provisional application No. 63/624,871, filed on Jan. 25, 2024.

(51) Int. Cl.
*B64D 17/62*     (2006.01)
*B64D 17/24*     (2006.01)

(52) U.S. Cl.
CPC ............. *B64D 17/62* (2013.01); *B64D 17/24* (2013.01)

(58) Field of Classification Search
CPC ................................. B64D 17/62; B64D 17/24
See application file for complete search history.

(56) References Cited

U.S. PATENT DOCUMENTS

| | | | | |
|---|---|---|---|---|
| 4,117,994 A * | 10/1978 | Webb | ................... | B64D 17/343 244/152 |
| 4,678,145 A * | 7/1987 | Buehrer | ............... | B64D 17/343 244/152 |
| 5,005,785 A * | 4/1991 | Puskas | ................. | B64D 17/025 244/152 |
| 5,738,307 A * | 4/1998 | Webb | ................... | B64D 17/343 244/152 |
| 5,890,678 A * | 4/1999 | Butler, Jr. | .............. | B64D 17/62 244/152 |
| 7,028,951 B1 * | 4/2006 | Sadeck | ................ | B64D 17/343 244/152 |
| 7,293,742 B2 * | 11/2007 | Sadeck | ................ | B64D 17/343 244/142 |
| 7,997,535 B2 * | 8/2011 | Babovka | ................ | B64D 17/18 244/145 |
| 10,689,123 B2 * | 6/2020 | Fox, Jr. | .................... | B64D 1/12 |
| 2001/0050323 A1 * | 12/2001 | Brownell | ............... | B64D 17/24 244/142 |
| 2010/0032527 A1 * | 2/2010 | Fox, Jr. | .................. | B64D 17/02 244/152 |

* cited by examiner

*Primary Examiner* — Justin M Benedik
(74) *Attorney, Agent, or Firm* — SNELL & WILMER L.L.P.

(57) ABSTRACT

A parachute assembly having inflation controlling characteristics can include a primary parachute, primary parachute suspension lines coupled to the primary parachute and extending downward therefrom toward a load, and a reefing system. The reefing system can include a slider canopy configured to control opening of the primary parachute. A plurality of slider suspension lines extend from the slider canopy whereby the slider canopy is slidingly coupled to the primary suspension lines. Each slider suspension line can be slidingly coupled to the primary suspension lines by a slider ring. Each slider ring can be configured to receive a plurality of primary suspension lines that converge together at a convergence point. In this manner, the slider ring can slide down the primary suspension lines, over the convergence point, and below the bottom ends of the primary suspension lines.

20 Claims, 17 Drawing Sheets

PARACHUTE SLIDER REEFING SYSTEMS AND METHODS

CROSS-REFERENCE TO RELATED APPLICATION

This application claims priority to and the benefit of U.S. Provisional Patent Application No. 63/624,871 filed on Jan. 25, 2024 entitled "PARACHUTE SLIDER REEFING SYSTEMS AND METHODS." The disclosure of the foregoing application is incorporated here by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to parachute systems, and particularly to reefing systems or devices for slowing the opening or inflation of a parachute to reduce shock.

BACKGROUND

Parachutes have long been used to lower personnel and unmanned cargo to the ground from airplanes and other aircraft. A known problem with the use of parachutes is the sudden shock when the canopy of the parachute opens and fills quickly with air. This is especially true at high speeds where the canopy fills more rapidly.

Further, as parachute-delivered payloads have become larger and heavier, the size of the parachutes have grown and/or the number of parachutes used per payload (e.g., parachute clusters) has grown. Larger parachutes can display undesirable inflation characteristics which limit the practical size of such parachutes. Moreover, it tends to be difficult to control the shape of the lower edge of the large canopy to maintain, for example in the case of a round parachute, a symmetric circular shape of the parachute during initial stages of inflation. Such parachutes tend to form in-folded portions and thus do not operate according to the designed inflation characteristics, thus often resulting in structural failure.

Clustered parachutes can offer several advantages over a single large parachute. First, clustered parachutes can provide a shorter opening time and distance. Second, clustered parachutes can be easier to fabricate and recover. However, a difficulty with clustered parachutes is that the parachutes in the cluster generally do not open simultaneously. A canopy (or some of the canopies) in a cluster will often inflate more rapidly than the other canopies in the cluster, thereby causing structural overloads on the early opening canopy (or canopies), and aerodynamic interference, which result in inflation difficulty in the late opening canopy (or canopies) and excessive filling times for the total cluster.

In an attempt to minimize these and other parachute inflation problems, large cargo parachutes are typically equipped with a "reefing" system to provide some control to the initial parachute inflation stage.

One type of existing reefing system consists of a series of reefing rings attached circumferentially around the periphery of the parachute canopy, a reefing line, and a reefing line cutter. The reefing line is passed through the reefing rings, and prevents the parachute canopy from opening fully. Therefore, this conventional reefing system is somewhat analogous to a set of trouser belt loops, having a belt sequentially threaded through them, with the belt tightly cinched until the reefing line cutter severs it. Once the reefing line is severed, the parachute is no longer restrained by the reefing line and the parachute is permitted to fully inflate. Even with a reefing system, however, initial inflation of individual parachutes in a parachute cluster is somewhat random, and parachute failures can still occur.

Another type of existing reefing system includes a generally round device having grommets around its periphery. The suspension lines of the parachute extend through these grommets, each grommet having a single suspension line extending therethrough. As the parachute begins to fill with air, the reefing device is initially positioned adjacent the open end of the canopy to retard the opening of the canopy of the parachute so as to prevent or avoid the shock associated with rapid filling of the canopy with air. As the canopy fills slowly with air the skirt portion of the canopy expands and the resulting tension on the suspension lines going through the guides in the reefing device acts to push the reefing device downwardly along the suspension lines and away from the canopy. In this manner, the amount of travel of the reefing device is limited by the length of the suspension lines. See, for example, U.S. Pat. Nos. 4,863,119 and 5,890,678.

However, these and other prior parachute systems have not previously provided a parachute inflation control device or reefing system which is simple, efficient, effective, and reliable in controlling the inflation of conventional parachutes, especially of large round canopies which have suspension lines that extend downward from the primary parachute skirt to the tops of long riser legs. Accordingly, improved systems and methods for controlling parachute inflation are desirable.

SUMMARY

In accordance with various embodiments, a parachute assembly having inflation controlling characteristics is disclosed. The parachute assembly comprises a parachute, a first plurality of suspension lines coupled to the parachute, a slider canopy configured to control opening of the parachute, and a plurality of slider suspension lines extending from the slider canopy whereby the slider canopy is slidingly coupled to the first plurality of suspension lines.

In various embodiments, the plurality of slider suspension lines extends from a skirt of the slider canopy. In various embodiments, each slider suspension line of the plurality of slider suspension lines comprises a length of between 15% and 35% of a diameter of the slider canopy. In various embodiments, the parachute assembly further comprises a plurality of slider rings, wherein each slider ring of the plurality of slider rings is coupled to an end of a respective slider suspension line of the plurality of slider suspension lines. The first plurality of suspension lines can extend through a first slider ring of the plurality of slider rings. In various embodiments, the parachute assembly further comprises a second plurality of suspension lines coupled to the parachute, wherein the second plurality of suspension lines extend through a second slider ring of the plurality of slider rings.

In various embodiments, the parachute assembly further comprises a first riser coupled to the first plurality of suspension lines via a first convergence point, wherein the first plurality of suspension lines converge at the first convergence point, and a second riser coupled to the second plurality of suspension lines via a second convergence point, wherein the second plurality of suspension lines converge at the second convergence point. The first slider ring can be configured to slide along the first plurality of suspension lines, over the first convergence point, and along the first riser and the second slider ring is configured to slide along the second plurality of suspension lines, over the second convergence point, and along the second riser when the slider canopy descends from the parachute.

In various embodiments, the parachute assembly further comprises a plurality of vents disposed in the slider canopy. In various embodiments, the plurality of vents are disposed circumferentially about the slider canopy and are located between 40% and 60% of a distance between a skirt of the slider canopy and an apex of the slider canopy. In various embodiments, a total area of the plurality of vents is equal to between 10% and 20% of an area of the slider. In various embodiments, the slider canopy comprises a dome shaped, pleated fabric material.

A reefing system is disclosed, in accordance with various embodiments. The reefing system comprises a slider canopy, a plurality of slider suspension lines coupled to the slider canopy, and a plurality of slider rings, each slider ring is coupled to an end of a respective slider suspension line of the plurality of slider suspension lines.

In various embodiments, the plurality of slider suspension lines are coupled at a skirt of the slider canopy. In various embodiments, each slider suspension line of the plurality of slider suspension lines comprises a length of between 15% and 35% of a diameter of the slider canopy. In various embodiments, the length is between 20% and 30% of the diameter of the slider canopy. In various embodiments, the length is between 24% and 26% of the diameter of the slider canopy. In various embodiments, the slider canopy comprises a plurality of radially extending reinforcement webbings, and a plurality of circumferentially extending reinforcement webbings. In various embodiments, the slider canopy further comprises a fabric disc coupled to an interior surface of the slider canopy, wherein at least one of the plurality of radially extending reinforcement webbings terminates at the fabric disc.

A method of initially shaping and temporarily restricting the opening of a mouth of a parachute main canopy having suspension lines attached around a lower edge thereof is disclosed. The method comprises forming a generally circular initial opening for said mouth during an initial stage of inflation of said main canopy by inflating a slider canopy which circumferentially and radially shapes said lower edge of said main canopy into said generally circular initial opening, providing an air flow path into said mouth for inflating said main canopy, and reefing said lower edge by slidingly engaging said suspension lines with a plurality of slider rings which are coupled to the slider canopy via a plurality of slider suspension lines at spaced locations around said slider canopy.

In various embodiments, the method further comprises generating radial tension in the plurality of slider suspension lines with said suspension lines, and in response to the radial tension, slidingly descending the slider canopy along said suspension lines. In various embodiments, the air flow path is through a plurality of vents disposed in the slider canopy.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for release systems, parachute construction, deployment, reefing, disreefing, release, recovery, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical system for parachute reefing and/or related methods of use.

A reefing system of the present disclosure includes a slider canopy having a plurality of slider suspension lines coupled around the edge thereof. The slider suspension lines are configured to couple to primary suspension lines of the primary parachute. Each slider suspension line has a slider ring at an end thereof whereby the slider suspension lines slidingly engage the primary suspension lines. The primary suspension lines can be grouped together and converge at a convergence point. A slider ring can be configured to receive more than one primary suspension line (e.g., the grouped together suspension lines) so that as the slider ring descends, the slider ring can slide over the convergence point. In various embodiments, the convergence point is coupled to a riser leg. In this regard, the slider ring can descend the primary suspension lines, slide over the convergence point, and down the riser leg. In this manner, a reefing system of the present disclosure can descend further away from the primary parachute than the length of the primary suspension lines. In contrast, a variety of situations may arise using conventional reefing devices where the reefing device is unable to slide far enough from the primary parachute to allow desired inflation.

Figure 1A:
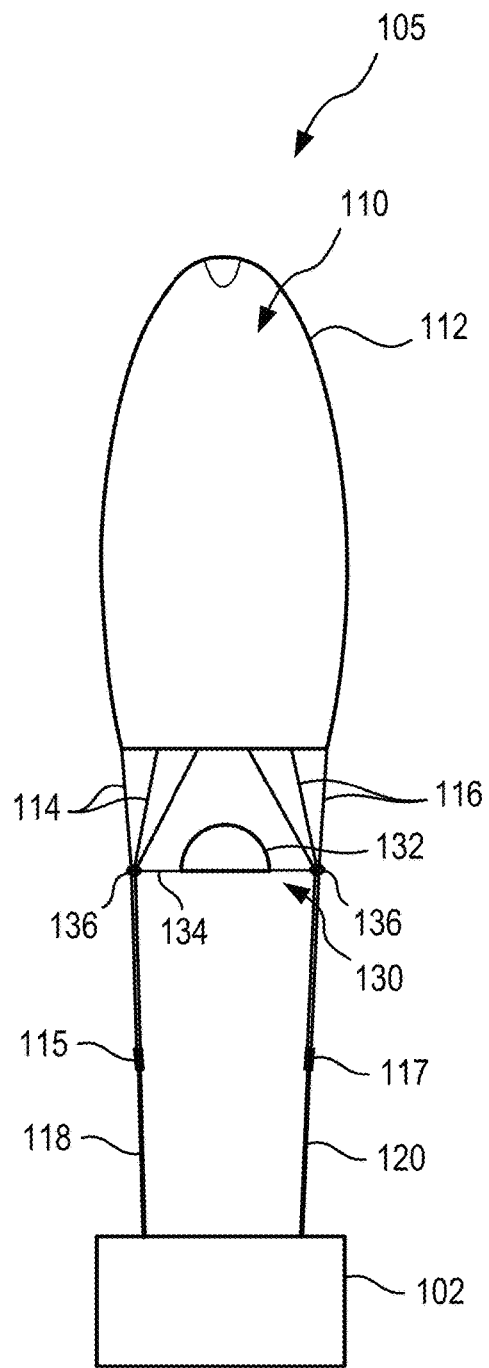
FIG. 1A and FIG. 1B illustrate a parachute assembly in a reefed configuration and a disreefed configuration, in accordance with an embodiment of the present disclosure.
Figure 1B:
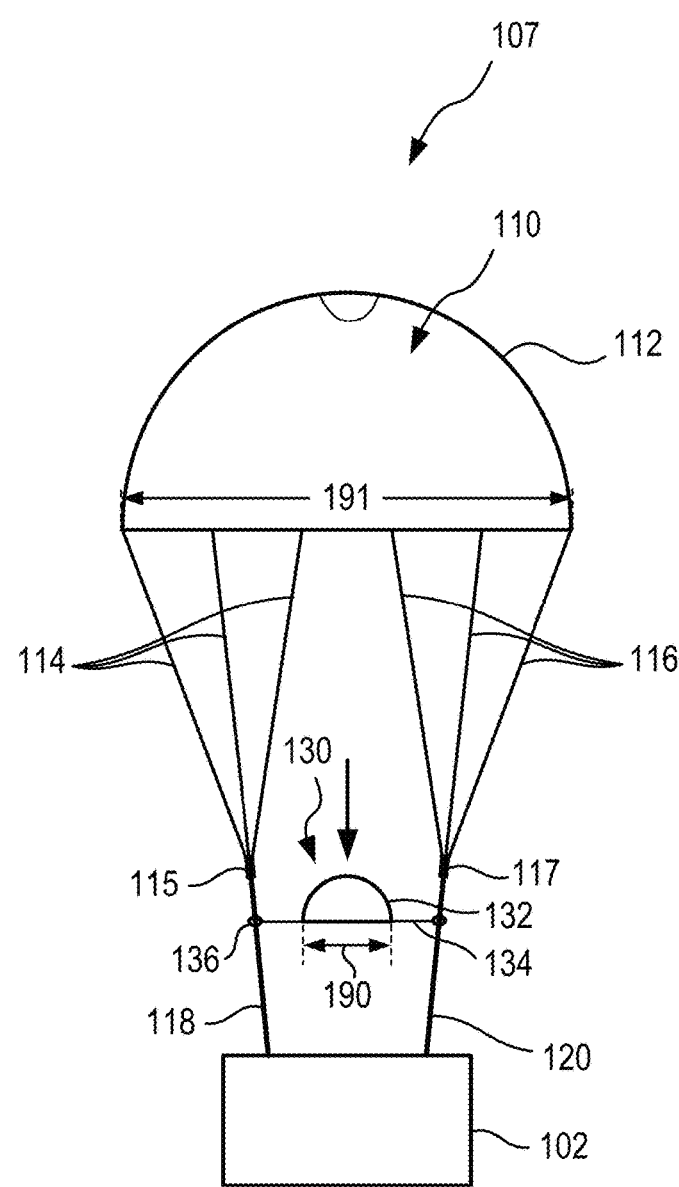

With reference to FIG. 1A and FIG. 1B, in accordance with various embodiments, a parachute, such as main parachute 110, may comprise a canopy 112 (also referred to herein as a primary canopy and a main canopy), and a plurality of suspension lines (e.g., first plurality of suspension lines 114 and second plurality of suspension lines 116) coupled to main canopy 112, for example, at the edges of canopy 112. The suspension lines can be connected to main canopy 112 and can descend therefrom to lower ends for attachment to a load (e.g., cargo 102). First plurality of suspension lines 114 may converge (or couple to one another) at a first convergence point 115. Second plurality of suspension lines 116 may converge (or couple to one another) at a second convergence point 117. In this manner, although two convergence points 115, 117 are illustrated for ease of illustration, additional convergence points (e.g., three, four, five, six, seven, eight, nine, ten, eleven, twelve, thirteen, fourteen, fifteen, sixteen, or more) can be disposed equidistantly about the canopy 112 whereby a plurality of immediately adjacent suspension lines converge. In the illustrated embodiment, first convergence point 115 is coupled to a first riser 118 and second convergence point 117 is coupled to a second riser 120; though in other embodiments first convergence point 115 and second convergence point 117 can be coupled directly to a payload (e.g., without the use of risers). Additionally, to help main parachute 110 inflate in a controlled manner, the parachute system may comprise a reefing system 130. Reefing system 130 restricts the inlet size of main parachute 110, and thus prevents the canopy 112 from fully inflating until the reefing system 130 is lowered. That is, the reefing system 130 is configured to retain main parachute 110 in a reefed configuration 105 to extend or slow inflation of main parachute 110 to reduce shock experienced by cargo 102 and/or the parachute system itself.

In various embodiments, reefing system 130 includes a canopy 132 (also referred to herein as a slider canopy and/or an auxiliary canopy), a plurality of slider suspension lines 134 coupled to slider canopy 132, for example, at the edges of slider canopy 132, and a plurality of slider rings 136 coupled to the end of each slider suspension line 134. Stated differently, a slider ring 136 can be coupled to the end of each slider suspension line 134. When the parachute assembly is initially deployed, the primary canopy 112 is typically spread and inflated by a relatively high velocity air inflow. The reefing system 130 can be configured to retard the spreading and inflation of the primary canopy 112. The reefing system 130 can be pushed upward by the airflow and, simultaneously, downward by outward and downward tension in the suspension lines 114, 116. As the primary canopy 112 spreads, it produces high tension radial forces throughout the reefing system 130 due to high outward and downward forces from the suspension lines 114, 116 passing through slider rings 136 and high relative velocity air pushing the reefing system 130 upward. Over time, the primary canopy 112 will enlarge and produce sufficient drag to slow the parachute assembly, which will cause a decrease in the relative air velocity and, simultaneously, the reefing system 130 will descend (see FIG. 1B), decreasing its constricting effectiveness on the suspension lines 114, 116, and, in the process, the reefing system 130 will experience decreased radial tension loading and will become increasingly slack as it descends the suspension lines 114, 116 and/or risers 118, 120. For example, the reefing system 130 can descend to allow the main parachute 110 to reach an disreefed configuration 107. In this regard, the slider canopy 132 can be slidingly coupled to suspension lines 114, 116 via slider suspension lines 134 and slider rings 136.

Reefing system 130 can be sized and configured such that the diameter 190 of the slider canopy 132 skirt is between 5% and 15% of the fully inflated diameter 191 of the main parachute 110 in various embodiments, is between 7% and 13% of the fully inflated diameter 191 of the main parachute 110 in various embodiments, is between 8% and 12% of the fully inflated diameter 191 of the main parachute 110 in various embodiments, and is between 9% and 11% of the fully inflated diameter 191 of the main parachute 110 in various embodiments.

Figure 2:
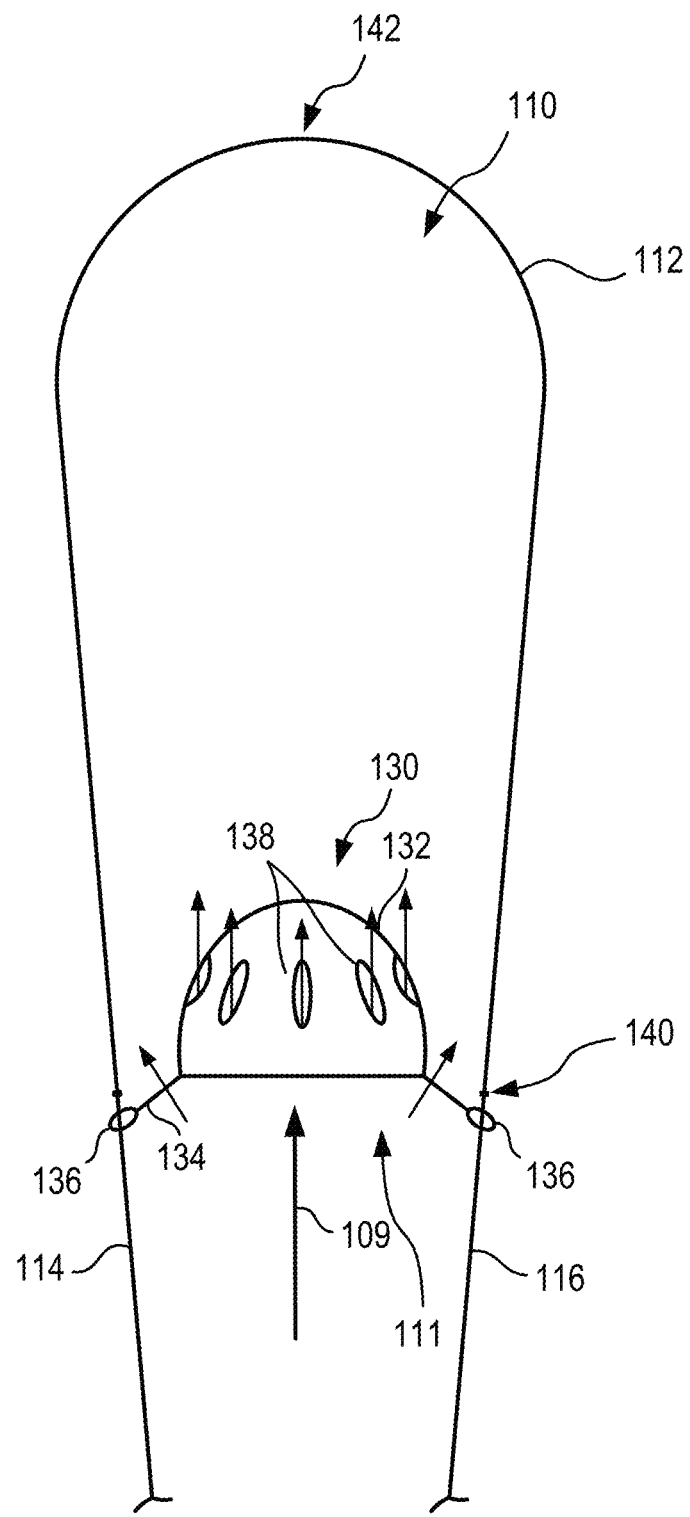
FIG. 2 illustrates a parachute assembly with an inflated reefing slider canopy in a reefed configuration, in accordance with an embodiment of the present disclosure.

With reference to FIG. 2, a parachute system is illustrated after being deployed and in a reefed configuration, in accordance with various embodiments. With respect to FIG. 2, elements with like element numbering, as depicted in FIG. 1A, are intended to be the same and will not necessarily be repeated for the sake of clarity.

In practice, during the packing process, the slider canopy 132 can be positioned inside the mouth or opening 111 of main canopy 112 with the slider rings 136 positioned up against, or near, the skirt 140 of the main canopy 112 and, during the initial deployment phase, the dynamic pressure, produced by the high velocity air inflow, represented by arrow 109, will cause rapid inflation of the slider canopy 132. This will, then, cause some incoming air flow 109 to be diverted around the slider canopy 132 and force the skirt 140 of the main canopy 112 outward and cause it to become circular (for circular main canopies 112) in the process. In various embodiments, slider rings 136 may be pulled upward and against the main canopy skirt 140 (i.e., the edge of the main canopy 112). In this manner, the upward aerodynamic force on slider canopy 132 by the high velocity air inflow 109 is converted into radially inward force on suspension lines 114, 116, and main canopy skirt 140 by the slider suspension lines 134 to hold the opening 111 at a predetermined size or diameter (i.e., primarily determined by the diameter of slider canopy 132 and the length of slider suspension lines 134) to retard inflation of main canopy 112.

Stated differently, a method of initially shaping and temporarily restricting the opening 111 of a mouth of a parachute main canopy 112 having suspension lines 114, 116 attached around a lower edge thereof can include forming a generally circular initial opening for said mouth during an initial stage of inflation of said main canopy 112 by inflating a slider canopy 132 which circumferentially and radially shapes said lower edge of said main canopy 112 into said generally circular initial opening. The method further includes providing an air flow path into said mouth for inflating said main canopy 112. For example, air flow paths are provided through vents 138. Moreover, an air flow path is provided around the edges of the slider canopy 132. The method further includes reefing said lower edge by slidingly engaging said suspension lines 114, 116 with the slider rings 136 which are coupled to the slider canopy 132 via the slider suspension lines 134 at spaced locations around said slider canopy 132.

Beyond causing airflow around the slider canopy 132, a plurality of vents 138 can be disposed in the slider canopy 132—though in various embodiments vents 138 can be omitted—to allow additional airflow through the slider and into main canopy 112 to facilitate inflation of the main canopy 112 crown area 142 (i.e., at or near the apex of the main canopy 112), thereby causing the crown area 142 of the main canopy 112 to fill properly.

Figure 3:
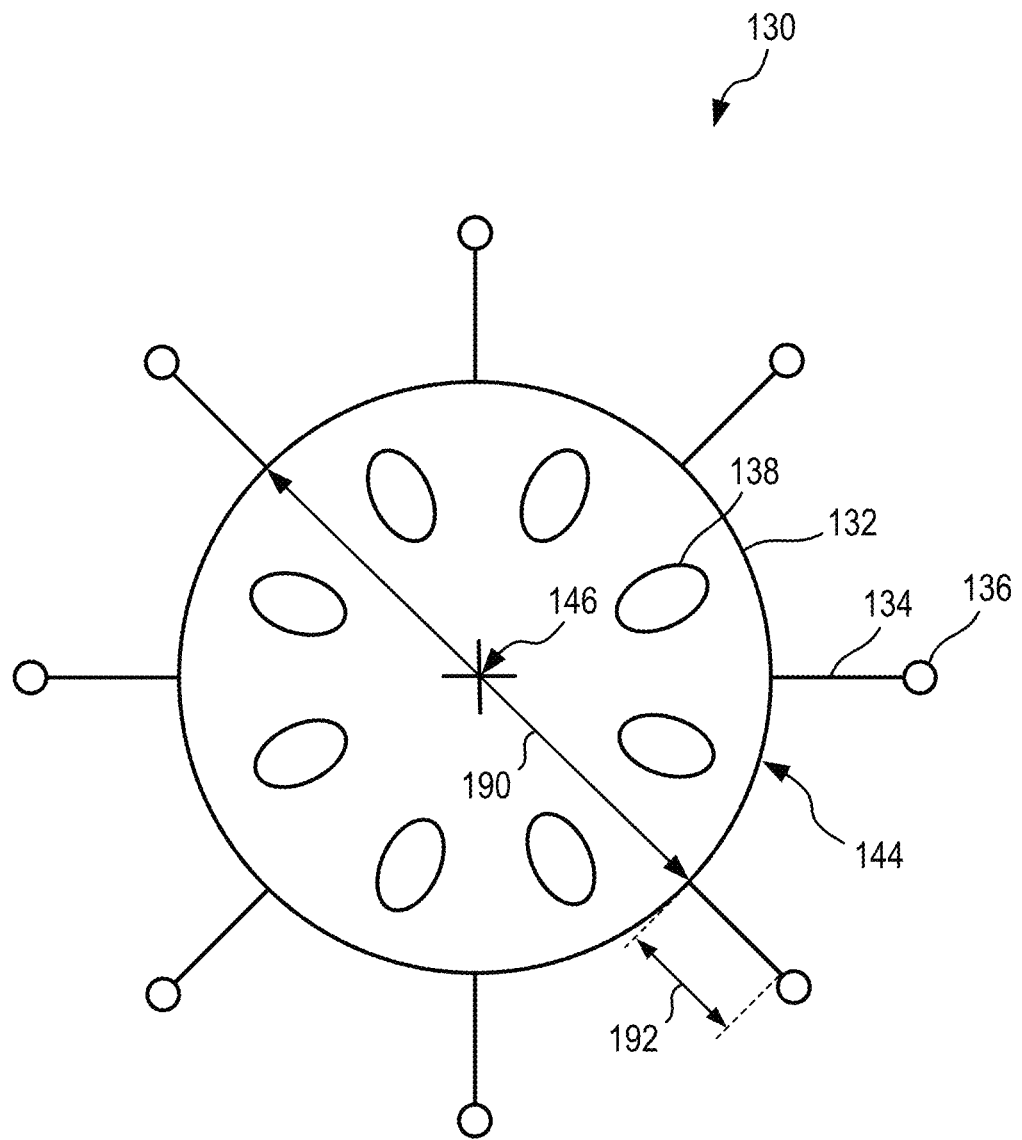
FIG. 3 illustrates a top view of a reefing system, in accordance with an embodiment of the present disclosure.

With reference to FIG. 3, the plurality of vents 138 can be disposed circumferentially about slider canopy 132. The plurality of vents 138 can be disposed equidistantly about slider canopy 132. In various embodiments, the combined area of vents 138 can be equal to between 10% and 20% of the total slider canopy 132 area, and in various embodiments is equal to between 12% and 18% of the total slider canopy 132 area, and in various embodiments is equal to between 14% and 16% of the total slider canopy 132 area.

In various embodiments, the vents 138 are centered about halfway between the slider canopy skirt 144 and the slider canopy apex 146, wherein the term "about" in this context can only mean±10%. Stated differently, each vent 138 can be disposed between 40% and 60% of the distance between the slider canopy skirt 144 and the slider canopy apex 146. In various embodiments, the vents 138 are centered halfway between the slider canopy skirt 144 and the slider canopy apex 146. Positioning the vents 138 radially away from the slider canpy apex 146 of the slider reefing canopy 132 can allow significantly more venting than if the venting was in the canopy center.

The length 192 of each slider suspension line 134 can be equal to between 15% and 35% of the slider canopy 132 diameter 190 in various embodiments, between 20% and 30% of the slider canopy 132 diameter 190 in various embodiments, and between 24% and 26% of the slider canopy 132 diameter 190 in various embodiments. In various embodiments, each slider suspension line 134 is equal in length.

A proximal end of each of the slider suspension lines 134 can be spaced around, and coupled to, the perimeter of slider canopy 132 while the distal end of each slider suspension line 134 connects to a slider ring 136. The slider ring 136 may be rigid, semi-rigid, or flexible. The slider ring 136 may be a continuous structure or it may consist of less than 360 degrees of structure to allow it to be easily installed around a group of main canopy suspension lines.

Figure 13A:
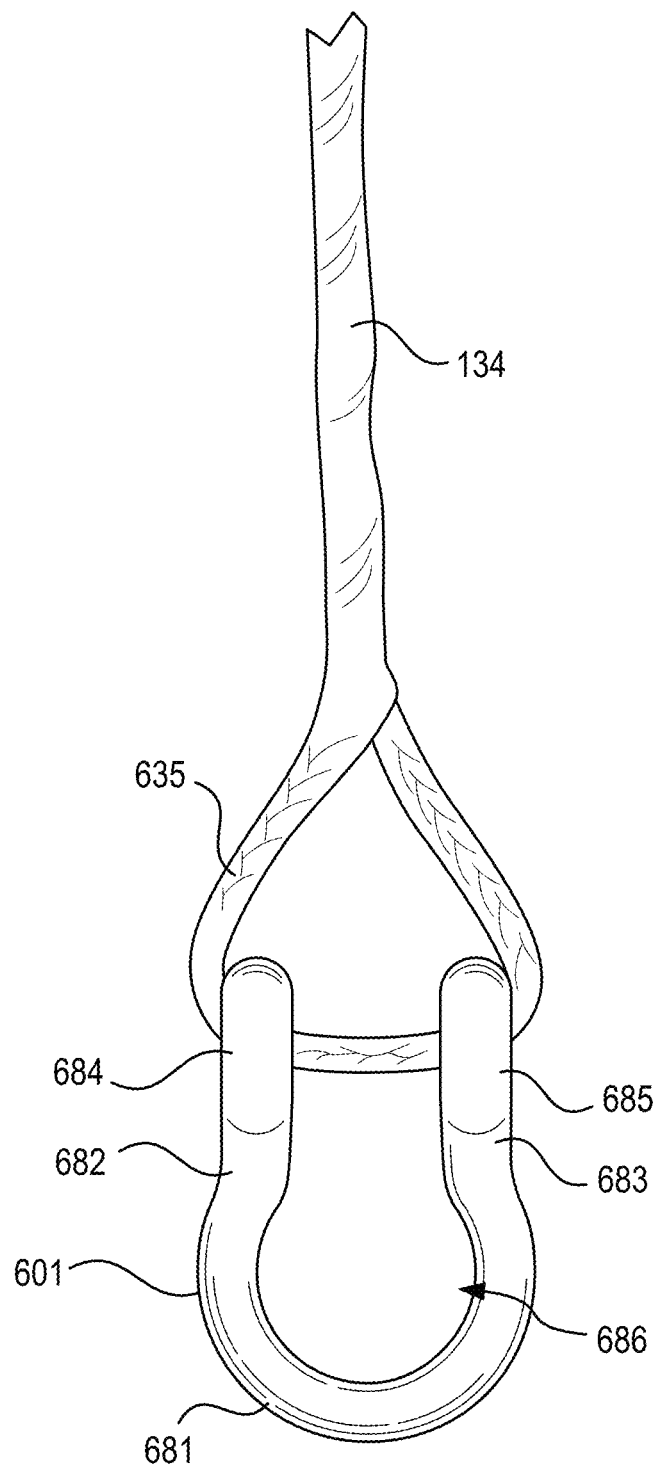
FIG. 13A illustrates a slider ring comprising a shackle defining openings configured to receive a slider suspension line for securing the slider suspension line to the shackle, in accordance with an embodiment of the present disclosure.

In various embodiments, and with momentary reference to FIG. 13A, slider ring 136 can comprise a shackle 601 that is generally u-shaped as shown in the drawings. The shackle body can include a bow portion 681 and a pair of spaced apart arms 682, 683. Each arm 682, 683 has an arm free end 684, 685, respectively. Each arm 682, 683 provides an opening through which slider suspension line 134 extends. The slider suspension line 134 can include a loop 635 formed at an end thereof that extends through the openings provided by arms 682, 683. In this manner, shackle 601 and slider suspension line 134 together form an opening or aperture 686 through which one or more main canopy suspension lines (e.g., first plurality of suspension lines 114 or second plurality of suspension lines 116) extend.

Figure 13B:
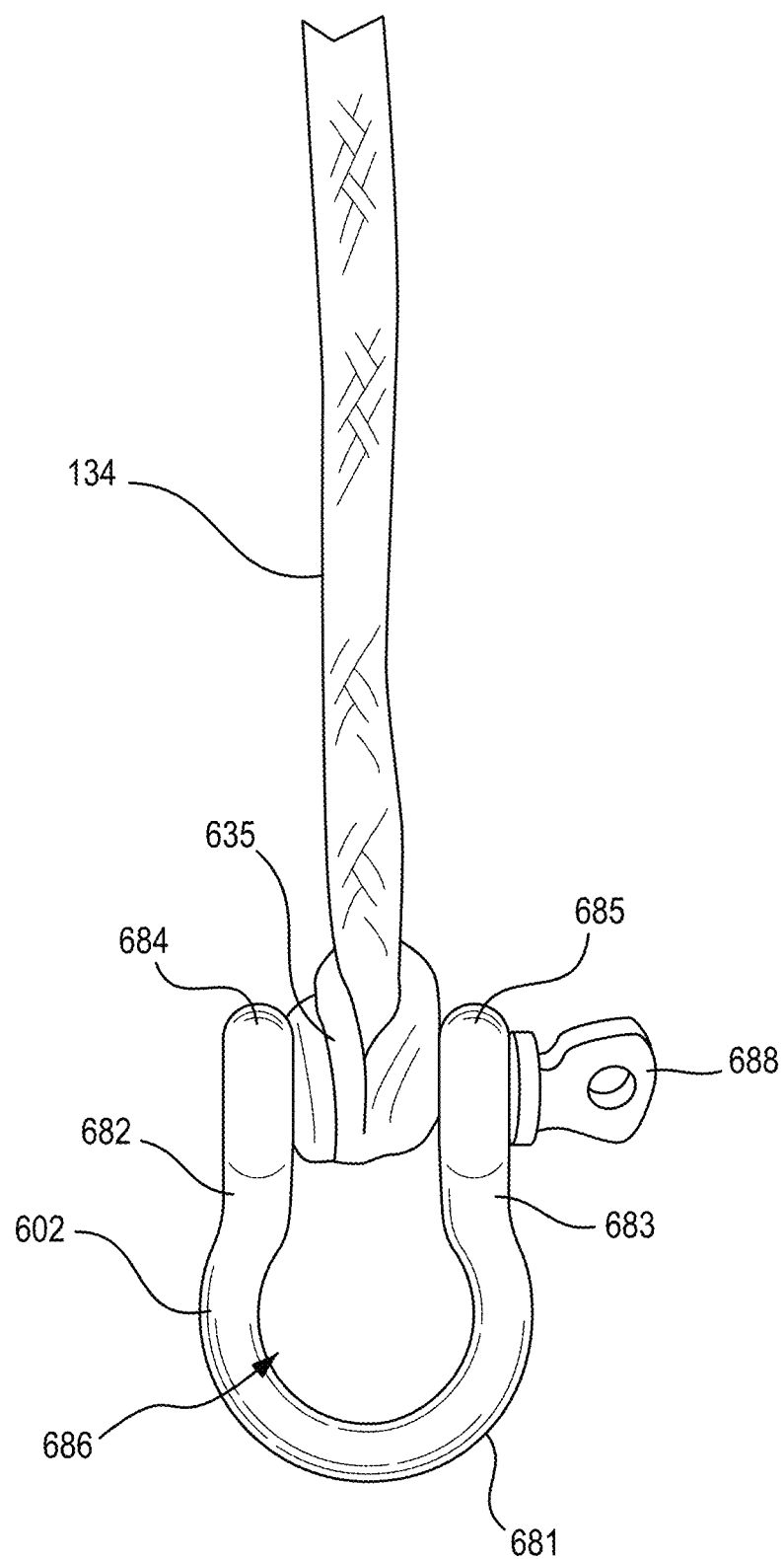
FIG. 13B illustrates a slider ring comprising a shackle defining openings configured to receive a pin for securing a slider suspension line to the shackle, in accordance with an embodiment of the present disclosure.

In various embodiments, and with momentary reference to FIG. 13B, slider ring 136 can comprise a shackle 602 that is generally u-shaped as shown in the drawings. Shackle 602 can be similar to shackle 601, except that each arm 682, 683 provides an opening through which shackle pin 688 extends. In this regard, with respect to FIG. 13B, elements with like element numbering, as depicted in FIG. 13A, are intended to be the same and will not necessarily be repeated for the sake of clarity. Pin 688 can be used to secure slider suspension line 134 to the shackle bow 681. In this manner, pin 688 and bow 681 surround opening 686. Stated differently, shackle 602 and pin 688 together form aperture 686 through which one or more main canopy suspension lines (e.g., first plurality of suspension lines 114 or second plurality of suspension lines 116) extend. Loop 635 can be wrapped around pin 688.

Figure 13C:
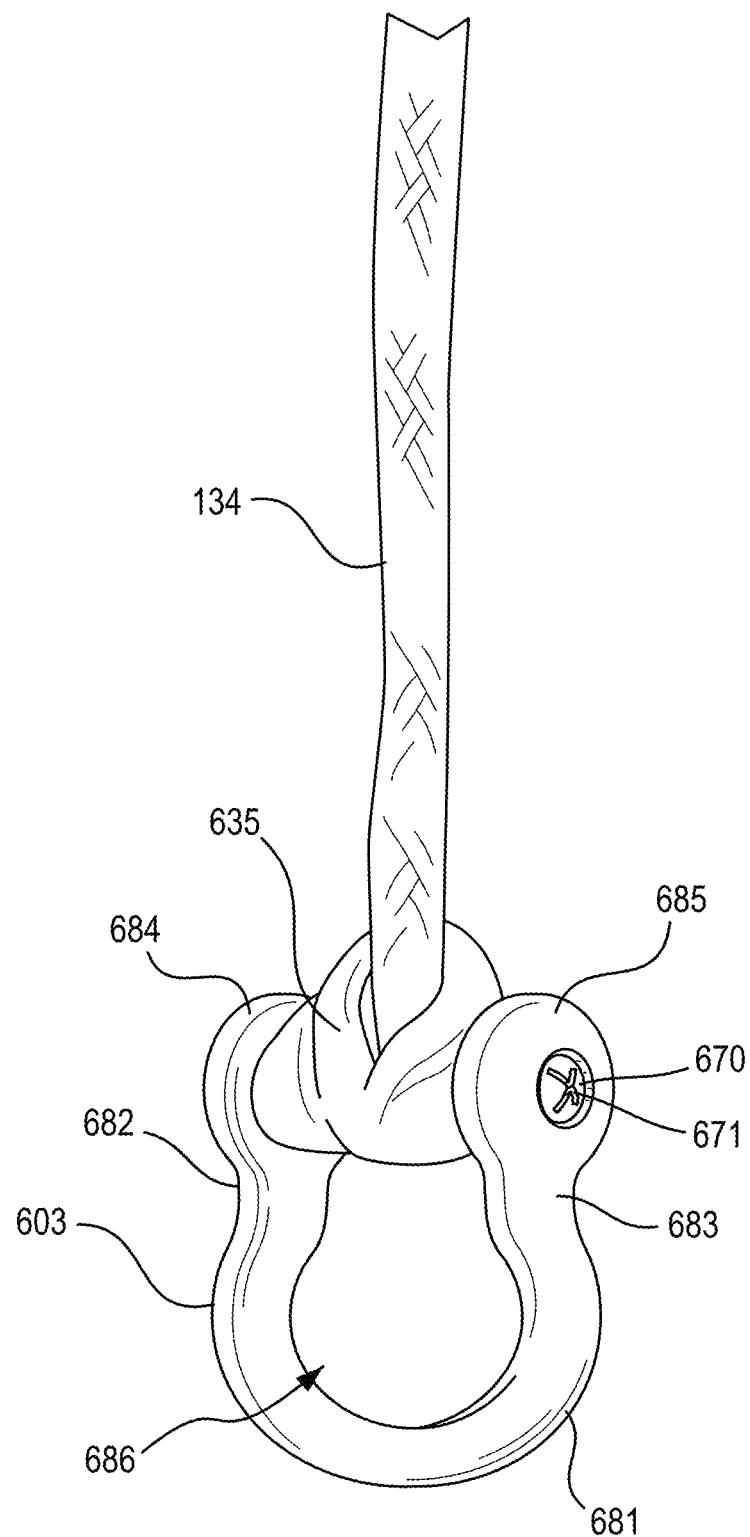
FIG. 13C illustrates a slider ring comprising a shackle defining openings configured to receive a pin for securing a slider suspension line to the shackle, in accordance with an embodiment of the present disclosure.

In various embodiments, and with momentary reference to FIG. 13C, slider ring 136 can comprise a shackle 603 that is generally u-shaped as shown in the drawings. Shackle 603 can be similar to shackle 602, except that, instead of having a finger tab extending from the head of pin 688, pin 670 comprises a slot 671 configured to receive a tool (e.g., a screwdriver) for turning the pin 670 with respect to shackle 603 when installing the pin 670 into shackle 603. In this regard, with respect to FIG. 13C, elements with like element numbering, as depicted in FIG. 13B, are intended to be the same and will not necessarily be repeated for the sake of clarity. Pin 670 can be flush with shackle 603, or minimally protrude from shackle 603, so as to mitigate the likelihood of slider suspension line 134 becoming entangled with pin 670.

Figure 4:
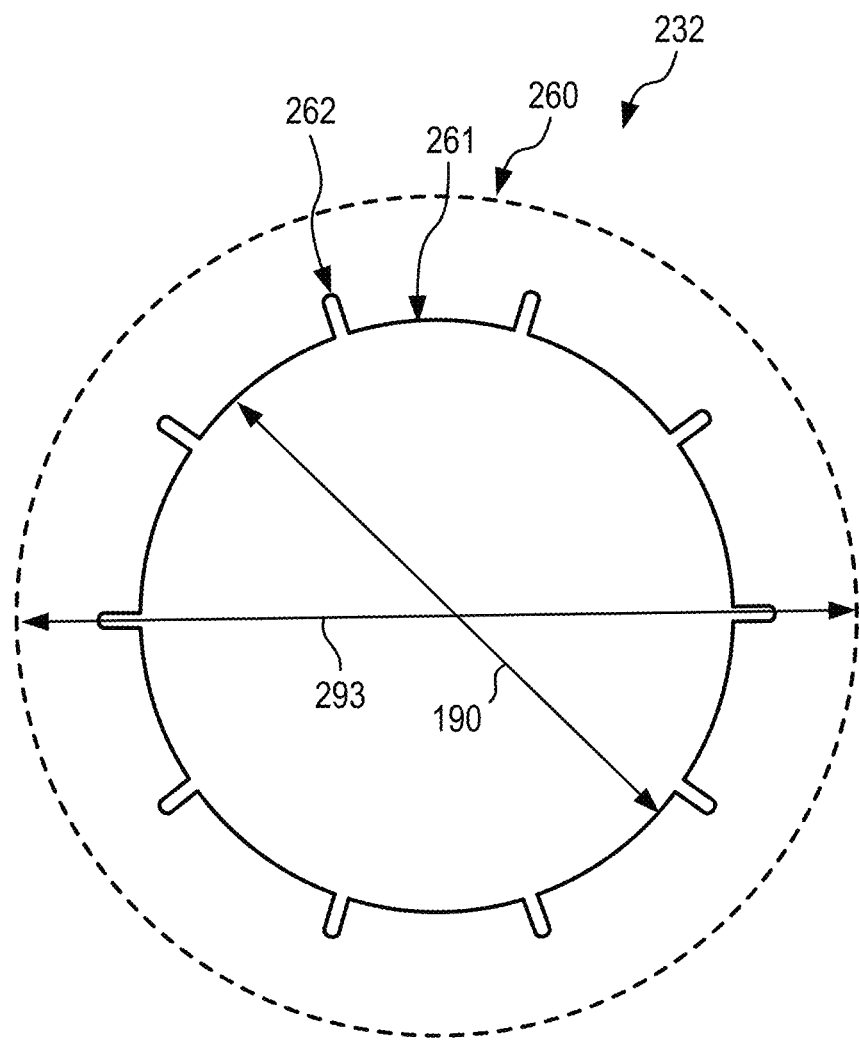
FIG. 4 illustrates a top view of a slider canopy before and after a pleating process, in accordance with an embodiment of the present disclosure.

With reference to FIG. 4, a slider canopy 232 can be manufactured by taking a disc shaped fabric material 260 and forming pleats 262 around the perimeter of the fabric material 260, which results in a dome shaped canopy 261 that functions much like a true hemispherical canopy, but without the time consuming and expensive process of forming and joining gores to form a classic hemispherical shape. In various embodiments, the pleats 262 are sewn in place. Unlike a dome shaped canopy of the present disclosure, a slider canopy that is configured as a flat disc tends to "over-inflate," which could result in little or no control of the initial inflation forces. In contrast, a generally hemispherical canopy, such as dome shaped slider canopy 232, acting as a reefing device cannot inflate beyond the designed (reduced) skirt diameter and will, therefore, function to limit the initial inflation forces, which are, in large part, dictated by the skirt diameter of the slider canopy 232.

In various embodiments, the disc shaped fabric material 260 (before the pleats are formed) may comprise a flat circular disc shape, though other shapes are contemplated such as polygons with four, five, six, seven, eight, nine, ten, eleven, twelve, thirteen, fourteen, fifteen, sixteen, or more sides.

The reduced skirt diameter 190 of the dome shaped pleated fabric material 261 can be between 55% and 80% of the original diameter 293 of the disc shaped fabric material 260 in various embodiments, between 60% and 75% of the original diameter 293 of the disc shaped fabric material 260 in various embodiments, between 64% and 69% of the original diameter 293 of the disc shaped fabric material 260 in various embodiments, and two thirds the original diameter 293 of the disc shaped fabric material 260 in various embodiments.

Figure 5:
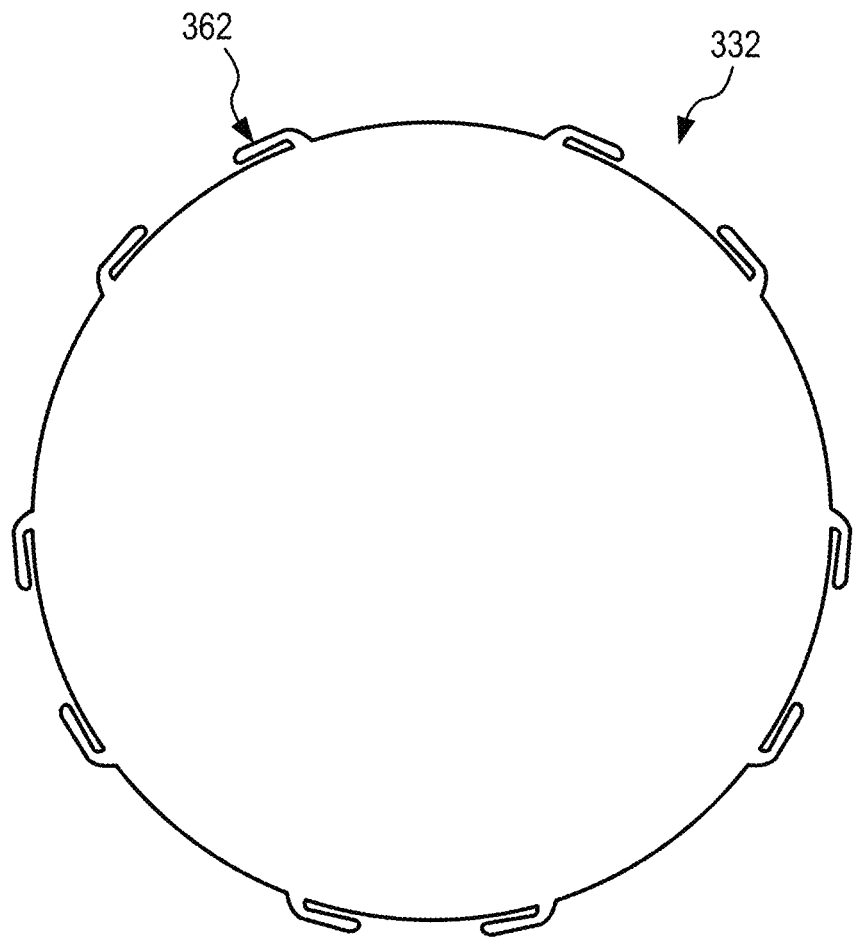
FIG. 5 illustrates a top view of a pleated slider canopy, in accordance with an embodiment of the present disclosure.

In various embodiments, the pleats 262 can extend radially outward from the slider canopy material (e.g., see slider canopy 232 of FIG. 4 which illustrates pleats 262 extending radially outward from the slider canopy 232). In various embodiments, the pleats 262 can be folded back onto the slider canopy material (e.g., see slider canopy 332 of FIG. 5 which illustrates pleats 362 folded back onto the canopy material of slider canopy 332).

Figure 6A:
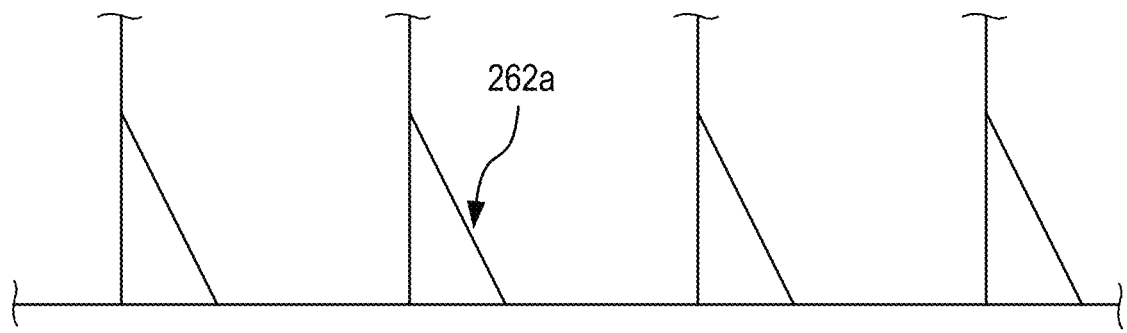
FIG. 6A illustrates a schematic view of a plurality of pleats formed in a single direction, in accordance with an embodiment of the present disclosure.
Figure 6B:
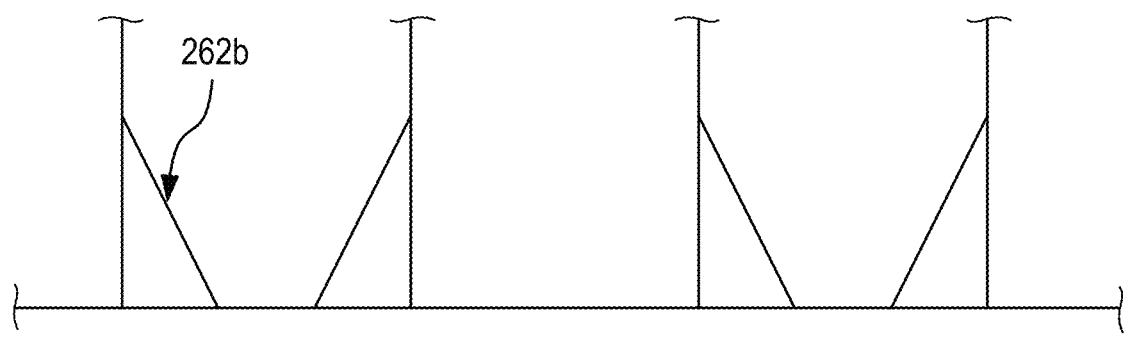
FIG. 6B illustrates a schematic view of opposing pleats, in accordance with an embodiment of the present disclosure.
Figure 6C:
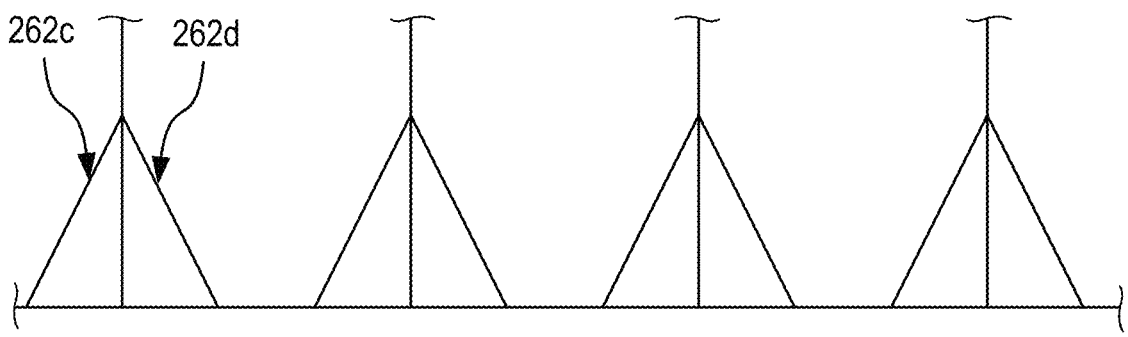
FIG. 6C illustrates a schematic view of opposing double pleats, in accordance with an embodiment of the present disclosure.

FIG. 6A illustrates pleats 262a formed in one direction. In some embodiments, forming the pleats 262a in a single direction around the edge of the slider canopy tends to cause the inflated slider canopy to rotate about its central axis. In this regard, in various embodiments the pleats 262b can be folded in opposing directions as illustrated in FIG. 6B. For example, each pleat 262b can be folded in an opposite direction from that of the adjacent pleats 262b. In various embodiments, the opposing pleats 262b are formed as a single pleat 262b (see FIG. 6B) or as opposing double pleats (e.g., see pleat 262c and pleat 262d formed as opposing double pleats) as illustrated in FIG. 6C.

Figure 7A:
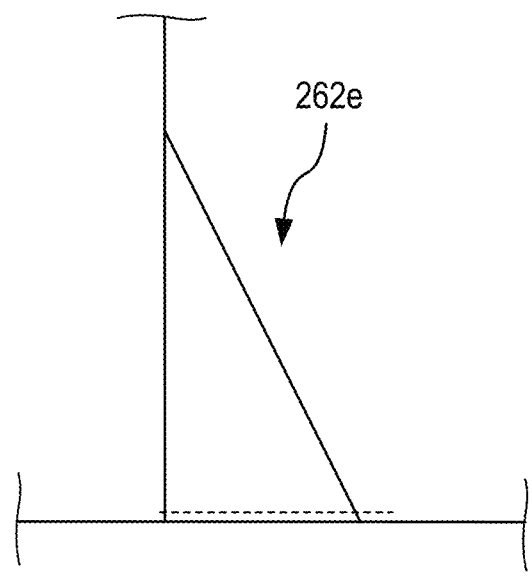
FIG. 7A illustrates a schematic view of a pleat sewn at an outside edge thereof, in accordance with an embodiment of the present disclosure.
Figure 7B:
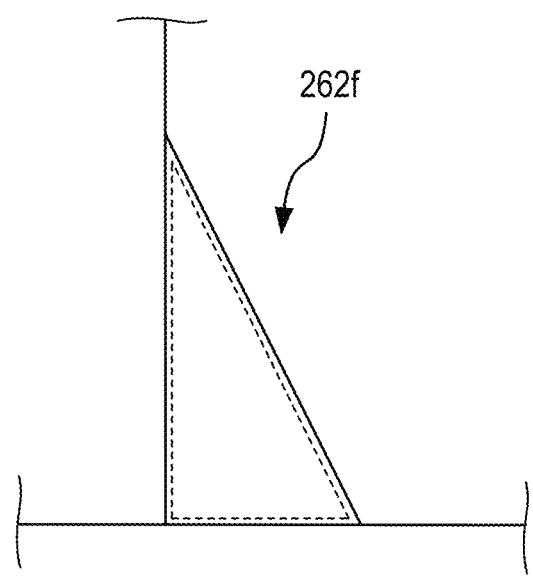
FIG. 7B illustrates a schematic view of a pleat as is sewn around the entire perimeter thereof, in accordance with an embodiment of the present disclosure.

With reference to FIG. 7A, one or more pleats 262e can be sewn only along the bottom (or outside) edge. For example, the pleats 262e can be sewn to circumferentially extending reinforcement webbing 464b, with momentary reference to FIG. 10A. In various embodiments, all pleats 262e of the slider canopy are sewn only along the bottom edge. With reference to FIG. 7B, one or more pleats 262f can be sewn around the entire perimeter thereof. In various embodiments, all pleats 262f of the slider canopy are sewn around the entire perimeter of the pleats 262f; though it is contemplated herein that the pleats of a slider canopy of the present disclosure can be sewn in various manners, including combinations of the sewing patterns described with respect to FIG. 7A and FIG. 7B. The pleats 262f can be disposed at separated locations around the circumference of the slider canopy.

Figure 8:
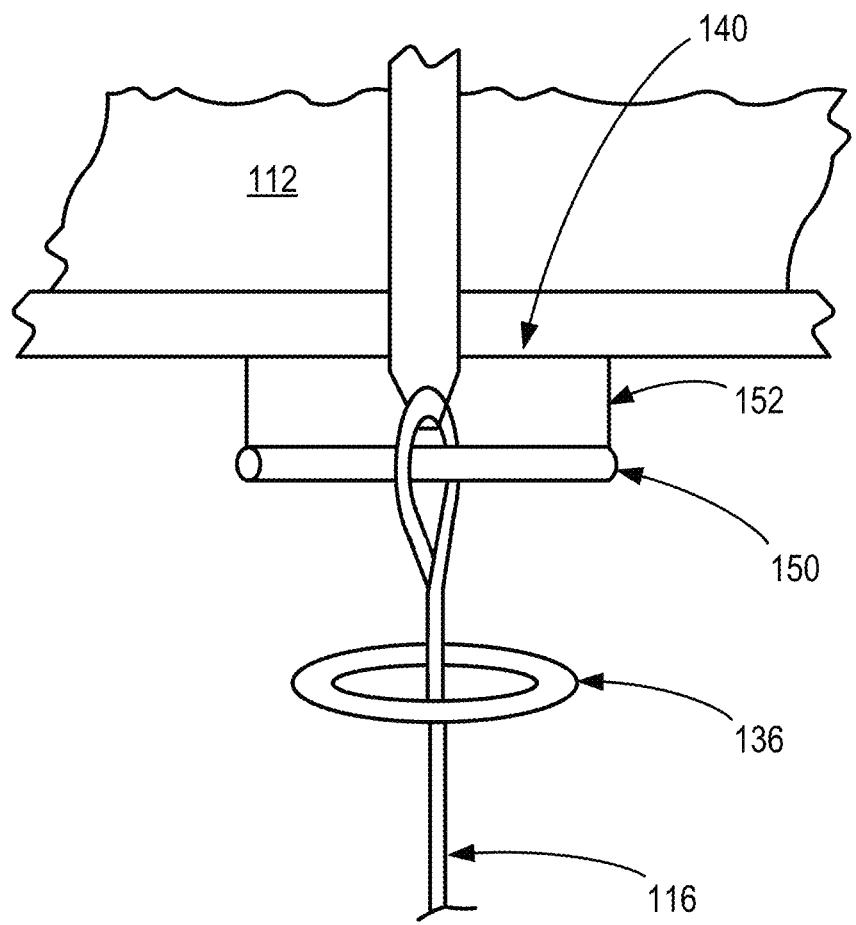
FIG. 8 illustrates a slider ring limiter arrangement disposed at a main canopy skirt, in accordance with an embodiment of the present disclosure.

With reference to FIG. 8, a rigid element 150 can be positioned near the top of the suspension lines 116 to prevent the slider ring 136 from being pulled up onto the main canopy 112 fabric where the slider ring 136 could otherwise become lodged and prevent a dis-reefing event from occurring. The rigid element 150 can comprise a rigid ring or a rigid rod positioned perpendicularly across the top of each suspension line 116 of the main canopy 112 to prevent such an occurrence. In various embodiments, the rigid element 150 can be coupled to the skirt 140 of the main canopy 112 with a stabilization element 152 such as a webbing, a cord, or the like.

Figure 9:
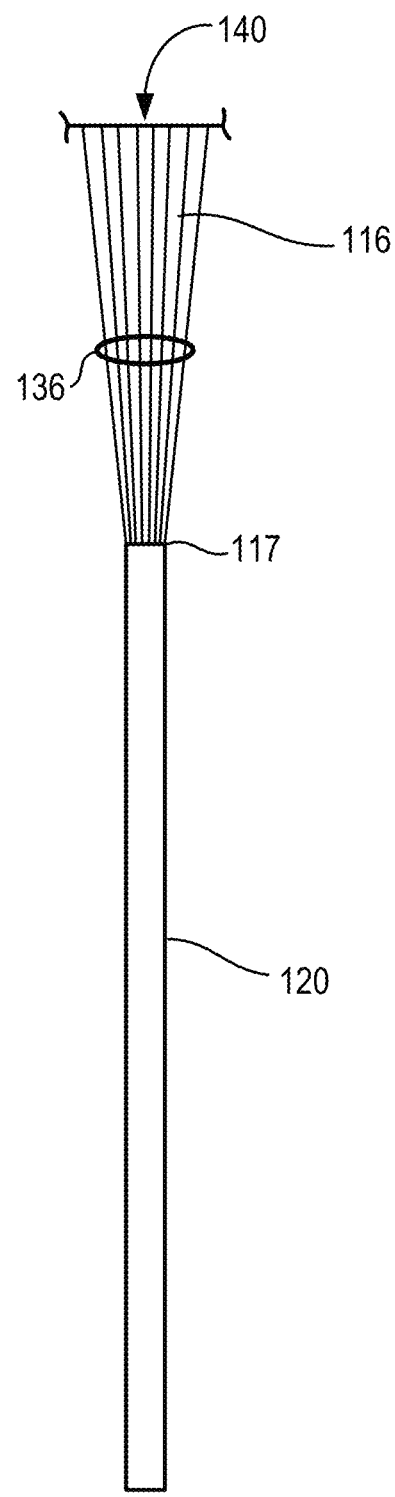
FIG. 9 illustrates a plurality of main canopy suspension lines extending through a slider ring, in accordance with an embodiment of the present disclosure.

With reference to FIG. 9, each slider ring 136 can encircle a group of primary parachute suspension lines 116 (e.g., not a single suspension line) and, therefore, the slider ring 136 can move down the group of suspension lines 116, over a suspension lines/riser convergence point 117, and down the riser leg 120, and thereby remove all constriction of the primary canopy circumference. In various embodiments, there is at least one slider ring 136 for each primary parachute suspension line group and riser leg combination.

Figure 10A:
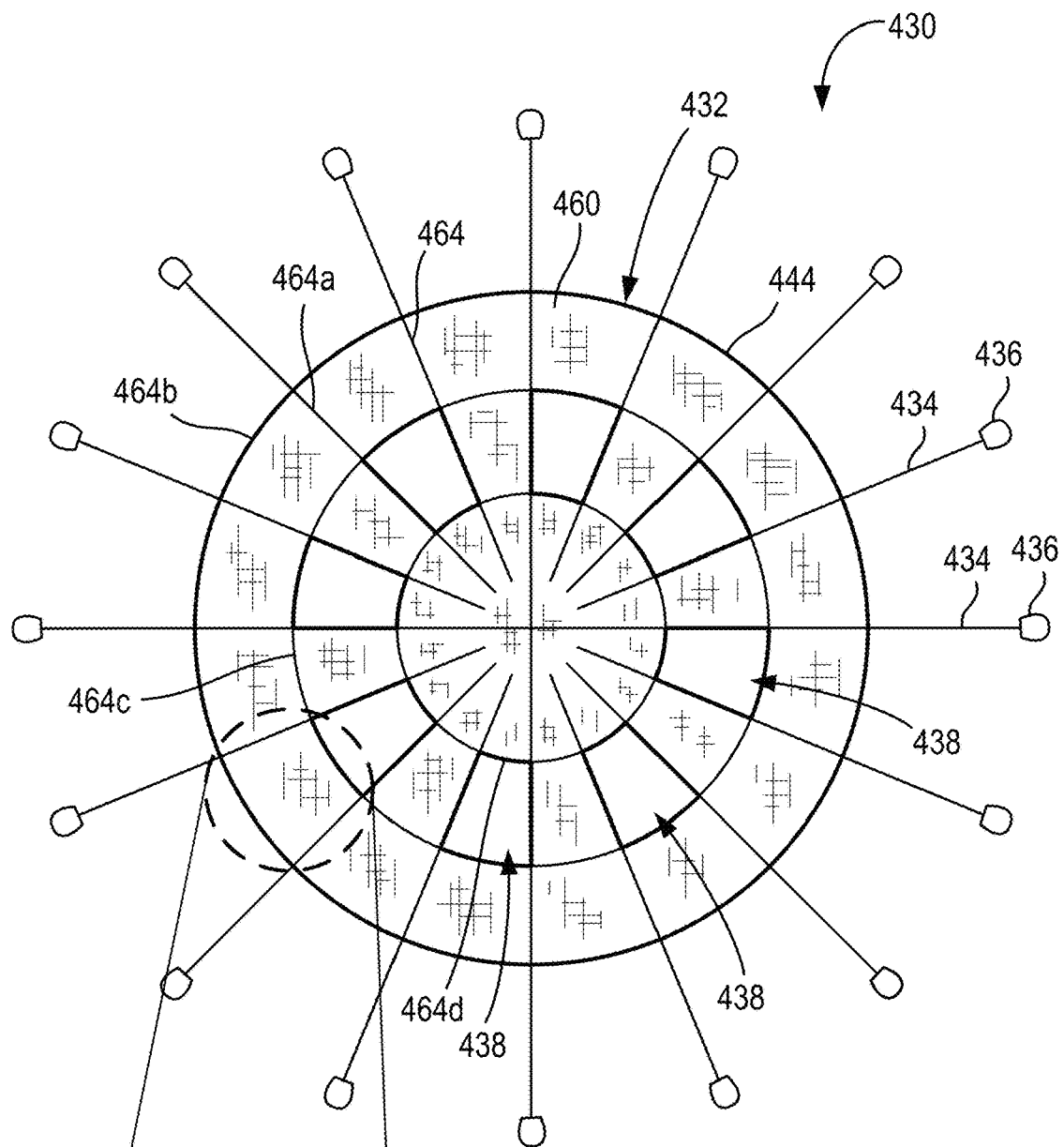
FIG. 10A illustrates a top view of a reefing system laid out in a flat configuration, in accordance with an embodiment of the present disclosure.

With reference to FIG. 10A a top view of a reefing system 430 laid out in a flat configuration is illustrated, in accordance with various embodiments. Reefing system 430 may be similar to reefing system 130 as described with respect to FIG. 1A through FIG. 9, in accordance with various embodiments. Reefing system 430 includes a canopy 432 (also referred to herein as a slider canopy), a plurality of slider suspension lines 434 coupled to the edges of slider canopy 432, and a plurality of slider rings 436 coupled to the free ends of the slider suspension lines 434. Slider canopy 432 may comprise a canopy material 460 and a plurality of reinforcement webbings 464 coupled (e.g., sewn) to the canopy material 460.

Figure 10C:
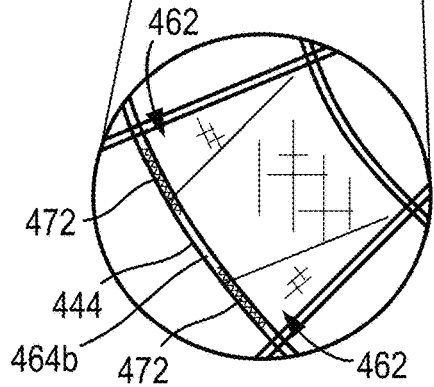
FIG. 10C illustrates an enlarged portion of the slider canopy of FIG. 10A with pleats formed in the slider canopy with stitching, in accordance with an embodiment of the present disclosure.

In various embodiments, slider canopy 432 is a dome shaped, pleated canopy, for example as described with reference to FIG. 4 through FIG. 7B. With combined reference to FIG. 10A and FIG. 10C, stitching 472 can be placed at discrete locations along the skirt 444 (e.g., along circumferentially extending reinforcement webbing 464b) to secure pleats 462 in place.

In various embodiments, and with reference to FIG. 10A, a first plurality of reinforcement webbings 464a extend radially (with respect to the centerline axis extending through the apex of the slider canopy 432) between an apex of the slider canopy 432 and the slider canopy skirt 444. In the illustrated embodiment, sixteen radially extending reinforcement webbings 464a extend between the apex of the slider canopy 432 and the slider canopy skirt 444; though in various embodiments other quantities of reinforcement webbings 464a can be used, for example depending on the number of suspension line groups of the main parachute. In various embodiments, slider suspension lines 434 are aligned with, and extend radially outward from, reinforcement webbings 464a.

In various embodiments, one or more (e.g., two, three, or more) circumferentially extending reinforcement webbings (e.g., reinforcement webbing 464b, reinforcement webbing 464c, and reinforcement webbing 464d) extend circumferentially around slider canopy 432. Reinforcement webbing 464b can be disposed at the slider canopy skirt 444. In various embodiments, the reinforcement webbing 464b delineates the outer edge of the slider canopy 432. Reinforcement webbing 464c can be disposed between the slider canopy skirt 444 and the apex of the slider canopy 432. In various embodiments, reinforcement webbing 464c delineates a radially outer edge of the vents 438. Stated differently, a radially outer edge of the vents 438 can be at least partially defined by reinforcement webbing 464c. Reinforcement webbing 464d can be disposed between reinforcement webbing 464c and the apex of the slider canopy 432. In various embodiments, reinforcement webbing 464d delineates a radially inner edge of the vents 438. Stated differently, a radially inner edge of the vents 438 can be at least partially defined by reinforcement webbing 464d.

Having described reinforcement webbing 464c as delineating a radially outer end of the vents 438 and reinforcement webbing 464d as delineating a radially inner end of the vents 438, the sides of the vents 438 can be delineated by adjacent radially extending reinforcement webbings 464a. In this regard, a first radially extending reinforcement webbing 464a can be disposed at a first side of a vent 438 and a second radially extending reinforcement webbing 464a can be disposed at a second side of the vent 438. In various embodiments, each radially extending reinforcement webbing 464a delineates a side of a vent 438.

Figure 10B:
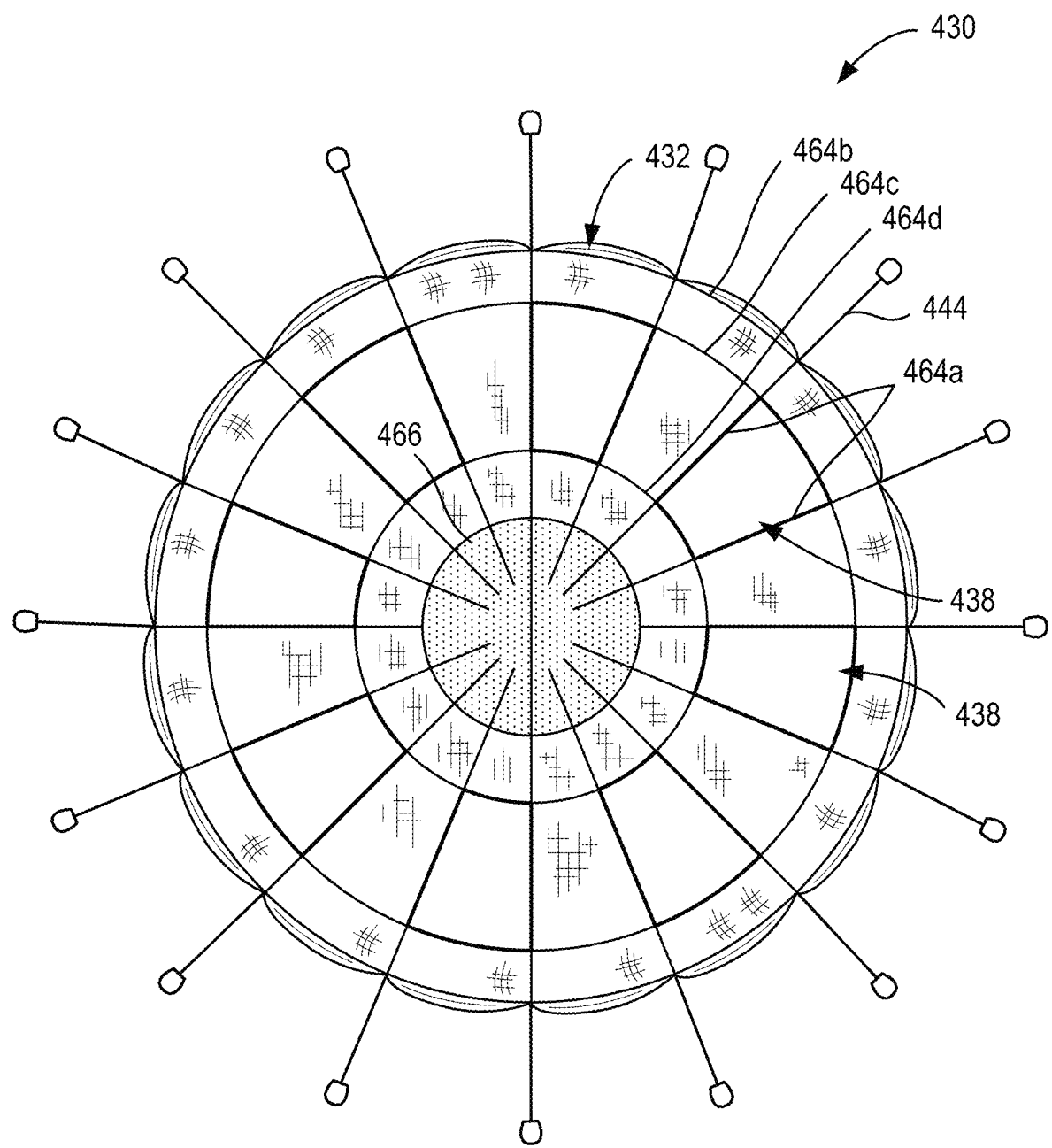
FIG. 10B illustrates a bottom, interior view of a reefing system with the slider canopy inflated, in accordance with an embodiment of the present disclosure.

With reference to FIG. 10B a bottom (interior) view of reefing system 430 with the slider canopy 432 inflated is illustrated, in accordance with various embodiments. Having described the radially extending reinforcement webbings 464a as extending between the apex of the slider canopy 432 and the slider canopy skirt 444, it will be appreciated that one or more radially extending reinforcement webbings 464a can intersect at the apex or center of the slider canopy 432 which tend to create a point mass. Such a point mass may initially whip about and cause damage to the slider canopy 432 or to adjacent components, such as the main parachute in which the slider canopy 432 has been inserted. A fabric disc 466 can be coupled to the interior surface of the slider canopy 432 as a point mass mitigating feature. Fabric disc 466 can comprise a relatively strong piece of fabric. In various embodiments, the fabric disc 466 is sewn to the slider canopy 432. The fabric disc 466 can be disposed at the apex or center of the slider canopy 432. In this regard, fabric disc 466 and slider canopy 432 can be in coaxial alignment.

In various embodiments, slider canopy 432 comprises a fabric, such as nylon or polyester, weighing between 1 oz. and 2.5 oz. per square yard (33.9 g.-84.8 g. per square meter). In various embodiments, the reinforcement webbings (e.g., reinforcement webbings 464a, 464b, 464c, 464d) comprises a nylon material, a polyester material, and/or an aramid fiber material (e.g., KEVLAR®). The reinforcement webbings can have a tensile strength of between 500 lb. and 1000 lb. In various embodiments, fabric disc 466 comprises a fabric, such as nylon or polyester, weighing between 6 oz. and 8 oz. per square yard (203-271 g. per square meter). The diameter of fabric disc 466 can be between 10% and 30% of the diameter of the slider canopy 432, between 10% and 25% of the diameter of the slider canopy 432, and between 15% and 25% of the diameter of the slider canopy 432, in accordance with various embodiments.

Figure 11A:
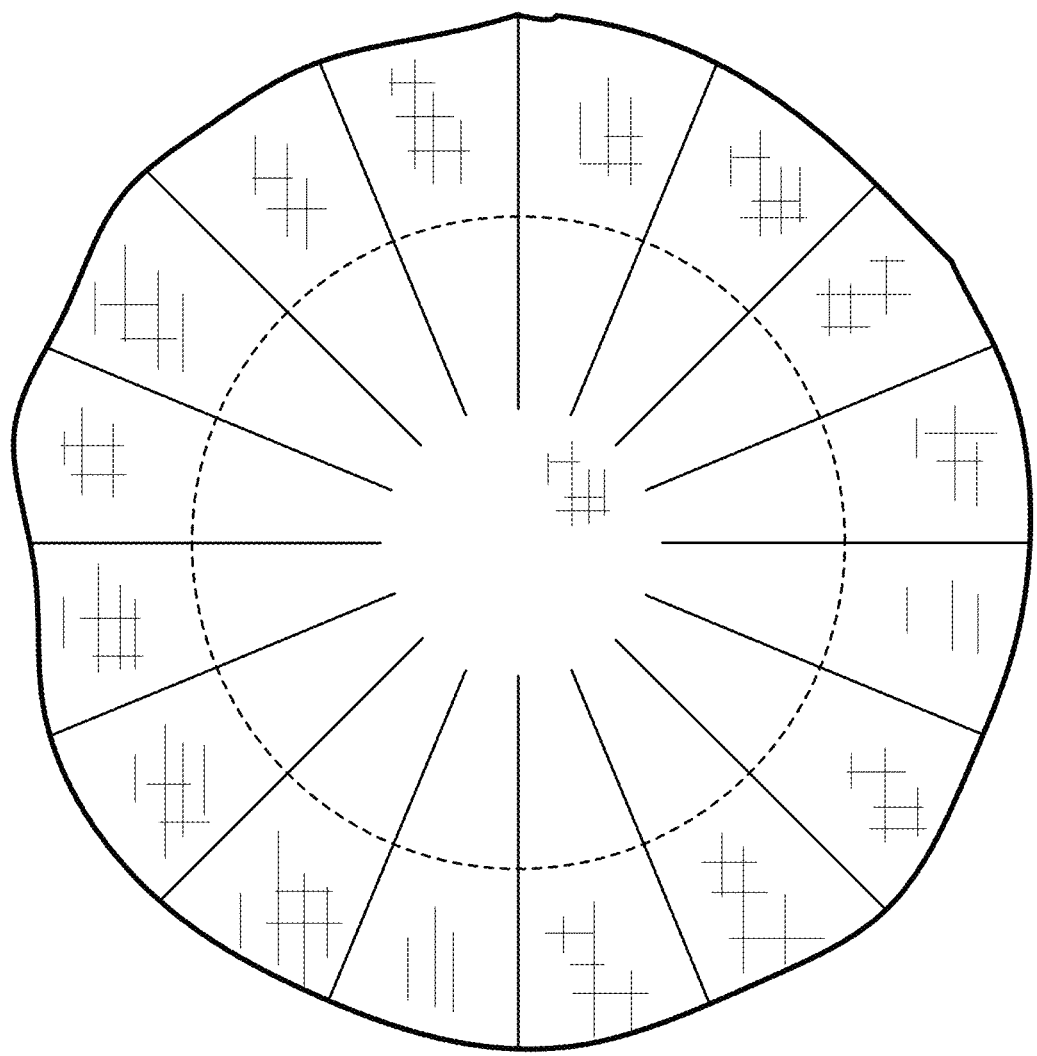
FIG. 11A illustrates an enlarged view of an exterior center portion of a slider canopy with radially extending reinforcement webbings that terminate prior to reaching the canopy apex, in accordance with an embodiment of the present disclosure.

In various embodiments, one or more of the radially extending reinforcement webbings 464a terminate at a location between the apex or center of the slider canopy and the slider canopy skirt 444. The radially extending reinforcement webbings 464a can terminate at the fabric disc 466. In various embodiments, most, but not all, of the radially extending reinforcement webbings 464a, on the canopy exterior, terminate prior to reaching the canopy apex; though in various embodiments, all of the radially extending reinforcement webbings 464a terminate prior to reaching the canopy apex (see FIG. 11A). In various embodiments, some of the radially extending reinforcement webbings 464a cross the canopy center. The radially extending reinforcement webbings 464a can be secured to the interior fabric disc 466 by through stitching. In this manner, the reinforcement material mass is spread out so as to not create a single point mass at the apex or center of the slider canopy 432.

Figure 11B:
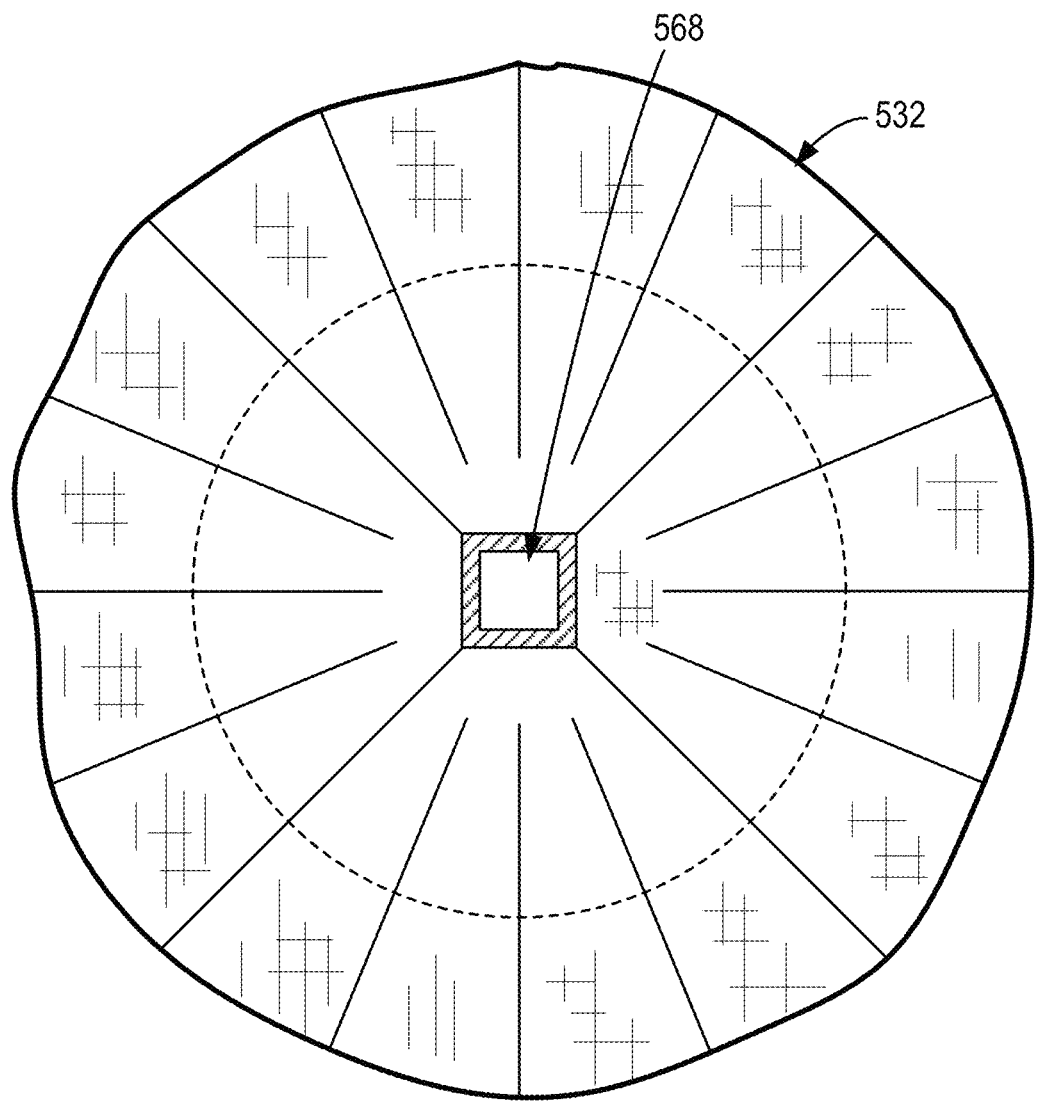
FIG. 11B illustrates an enlarged view of an exterior center portion of a slider canopy having a center suspension line aperture, in accordance with an embodiment of the present disclosure.
Figure 12:
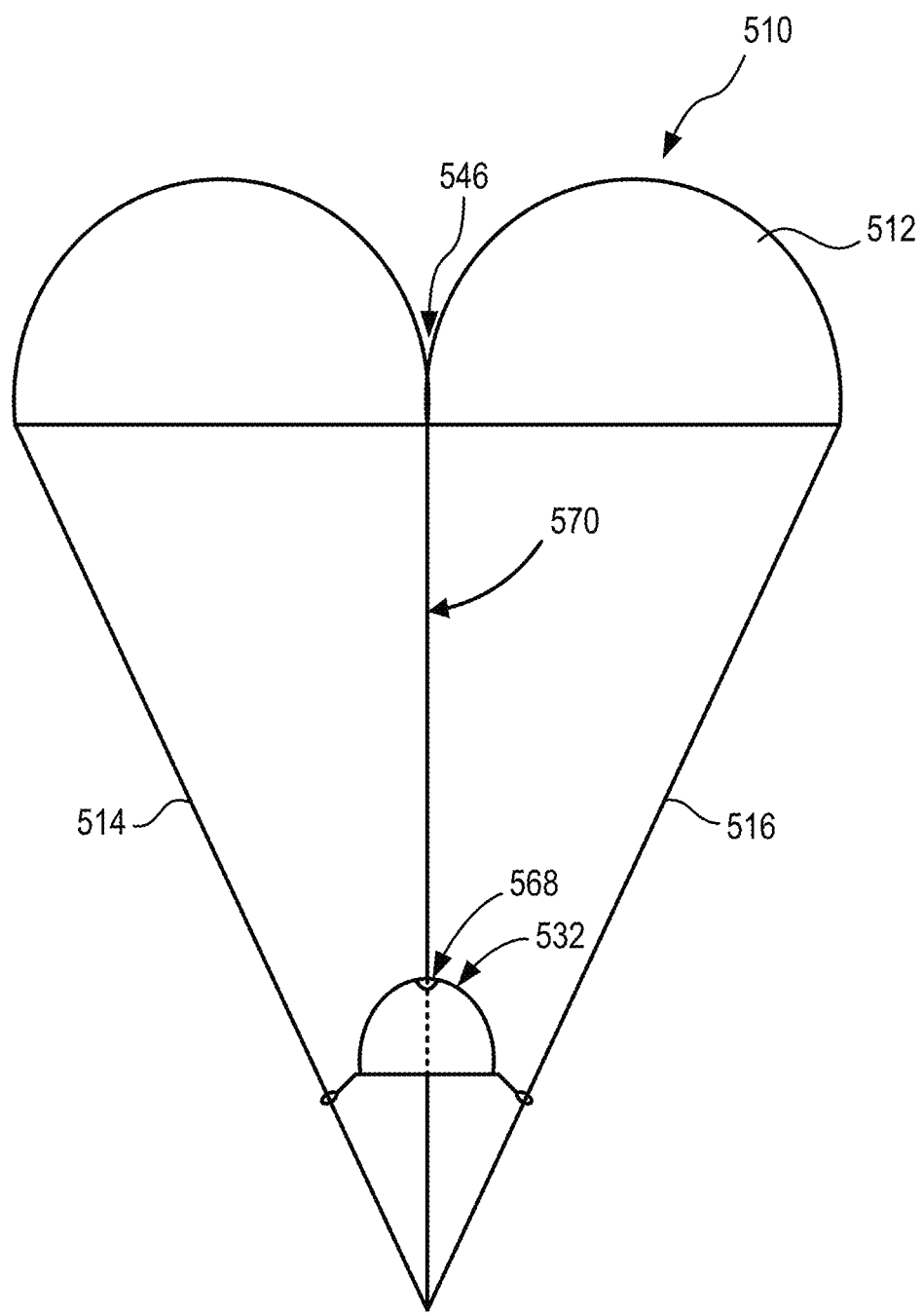
FIG. 12 illustrates a parachute assembly in a disreefed configuration with a center suspension line extending through a center suspension line aperture disposed in a slider canopy, in accordance with an embodiment of the present disclosure.

With reference to FIG. 11B an enlarged interior view of a slider canopy 532 having a center suspension line aperture 568 is illustrated, in accordance with various embodiments. With combined reference to FIG. 11B and FIG. 12, slider canopy 532 can be configured to interface with a primary parachute 510 (also referred to herein as a main parachute) having an apex retracting center line 570. Unlike the main canopy suspension lines 514, 516 which are coupled to the main canopy skirt, the apex retracting center line 570 can be coupled to the apex 546 of the main canopy 512. The apex retracting center line 570 can be configured to pull the apex 546 downward during operation of the primary parachute 510 to increase the drag area of the primary parachute canopy. The apex retracting center line 570 can pass through the center of the slider canopy 532 and, during operation, the slider canopy 532 can be configured to slide downward on the center line 570 just as the slider rings (e.g., slider rings 136) slide downward on the main canopy suspension lines (e.g., suspension lines 114, 116) and/or risers (e.g., risers 118, 120). In this regard, the center line pass through and sliding process is enabled by center suspension line aperture 568.

Principles of the present disclosure may be compatible with and/or utilize certain components or techniques disclosed in other U.S. Patents and/or U.S. Patent applications, including but not limited to: (i) U.S. Pat. No. 9,789,968 to Fox entitled "RING RELEASE SYSTEM AND METHODS"; (ii) U.S. Pat. No. 9,452,842 to Fox entitled "PARACHUTE CANOPY INSERT"; (iii) U.S. Pat. No. 9,399,514 to Fox entitled "AERIAL DELIVERY SYSTEM WITH MUNITION ADAPTER AND LATCHING RELEASE"; (iv) U.S. Pat. No. 8,864,080 to Fox entitled "EXPENDABLE AERIAL DELIVERY SYSTEM"; (v) U.S. Pat. No. 8,851,426 to Fox entitled "ENHANCED CRUCIFORM PARACHUTE"; (vi) U.S. Pat. No. 8,313,063 to Fox entitled "PARACHUTE RELEASE SYSTEM AND METHOD"; (vii) U.S. Pat. No. 8,210,479 to Fox entitled "PARACHUTE INLET CONTROL SYSTEM AND METHOD"; (viii) U.S. Pat. No. 8,096,509 to Fox entitled "AERIAL DELIVERY SYSTEM"; (ix) U.S. Pat. No. 8,083,104 to Fox entitled "AERIAL DELIVERY SYSTEM"; (x) U.S. Pat. No. 7,967,254 to Fox entitled "SLING RELEASE MECHANISM"; (xi) U.S. Pat. No. 7,264,205 to Fox entitled "PARACHUTE RELEASE APPARATUS"; (xii) U.S. Pat. No. 7,261,258 to Fox entitled "CRUCIFORM PARACHUTE DESIGN"; (xiii) U.S. Pat. No. 6,994,295 to Fox entitled "QUONSET TYPE PARACHUTE"; (xiv) U.S. Pat. No. 6,843,451 to Fox entitled "PARACHUTE SLIDER REEFING WITH FRICTION INDUCED RETARDATION"; (xv) U.S. Pat. No. 6,290,177 to Fox entitled "BI-DIRECTIONAL PILOT PARACHUTE RELEASE ASSEMBLY"; and (xvi) U.S. Pat. No. 10,689,123 to Fox entitled "PARACHUTE INLET CONTROL SYSTEM AND METHOD". Each of the foregoing are hereby incorporated by reference in their entireties for all purposes (but except for any subject matter disclaimers or disavowals, and except to the extent that the incorporated material is inconsistent with the express disclosure herein, in which case the language in this disclosure shall control).

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, various embodiments have been described. However, one of ordinary skill in the art appreciates that various modifications and changes can be made without departing from the scope of the present disclosure as set forth in the claims below. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the claims or specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A parachute assembly having inflation controlling characteristics comprising:
    a parachute;
    a first plurality of suspension lines coupled to the parachute;
    a first riser coupled to the first plurality of suspension lines via a first convergence point, wherein the first plurality of suspension lines converge at the first convergence point;
    a second plurality of suspension lines coupled to the parachute;
    a second riser coupled to the second plurality of suspension lines via a second convergence point, wherein the second plurality of suspension lines converge at the second convergence point;
    a slider canopy configured to control opening of the parachute;
    a plurality of slider suspension lines extending from the slider canopy whereby the slider canopy is slidingly coupled to the first plurality of suspension lines;
    a plurality of slider rings, wherein each slider ring of the plurality of slider rings is coupled to an end of a respective slider suspension line of the plurality of slider suspension lines; and
    wherein the first plurality of suspension lines extends through a first slider ring of the plurality of slider rings;
    the second plurality of suspension lines extends through a second slider ring of the plurality of slider rings; and
    the first slider ring is configured to slide along the first plurality of suspension lines, over the first convergence point, and along the first riser and the second slider ring is configured to slide along the second plurality of suspension lines, over the second convergence point, and along the second riser when the slider canopy descends from the parachute.

2. The parachute assembly of claim 1, wherein the plurality of slider suspension lines extends from a skirt of the slider canopy.

3. The parachute assembly of claim 2, wherein each slider suspension line of the plurality of slider suspension lines comprises a length of between 15% and 35% of a diameter of the slider canopy.

4. The parachute assembly of claim 1, further comprising a plurality of vents disposed in the slider canopy.

5. The parachute assembly of claim 4, wherein the plurality of vents are disposed circumferentially about the slider canopy and are located between 40% and 60% of a distance between a skirt of the slider canopy and an apex of the slider canopy.

6. The parachute assembly of claim 4, wherein a total area of the plurality of vents is equal to between 10% and 20% of an area of the slider canopy.

7. The parachute assembly of claim 1, wherein the slider canopy comprises a dome shaped, pleated fabric material.

8. The parachute assembly of claim 1, further comprising a rigid element coupled to the parachute and configured to prevent a main canopy of the parachute from moving into the first slider ring.

9. A reefing system comprising:
    a slider canopy;
    a plurality of slider suspension lines coupled to the slider canopy;
    a plurality of slider rings, each slider ring is coupled to an end of a respective slider suspension line of the plurality of slider suspension lines;
    a plurality of radially extending reinforcement webbings disposed between a skirt of the slider canopy and a center of the slider canopy; and
    a fabric disc disposed at the center of the slider canopy, wherein at least one of the plurality of radially extending reinforcement webbings terminates at the fabric disc.

10. The reefing system of claim 9, wherein the plurality of slider suspension lines are coupled at a skirt of the slider canopy.

11. The reefing system of claim 9, wherein each slider suspension line of the plurality of slider suspension lines comprises a length of between 15% and 35% of a diameter of the slider canopy.

12. The reefing system of claim 11, wherein the length is between 20% and 30% of the diameter of the slider canopy.

13. The reefing system of claim 12, wherein the length is between 24% and 26% of the diameter of the slider canopy.

14. The reefing system of claim 9, wherein the slider canopy comprises:
    a plurality of circumferentially extending reinforcement webbings, at least one of the circumferentially extending reinforcement webbings is disposed between the skirt of the slider canopy and the center of the slider canopy.

15. The reefing system of claim 9, wherein the fabric disc is coupled to an interior surface of the slider canopy.

16. The reefing system of claim 9, wherein the slider canopy comprises a dome shaped, pleated fabric material.

17. The reefing system of claim 9, further comprising a plurality of vents disposed in the slider canopy, wherein the plurality of vents are disposed circumferentially about the slider canopy and are located between 40% and 60% of a distance between a skirt of the slider canopy and an apex of the slider canopy, and a total area of the plurality of vents is equal to between 10% and 20% of an area of the slider canopy.

18. A method of initially shaping and temporarily restricting the opening of a mouth of a parachute main canopy having suspension lines attached around a lower edge thereof, the method comprising:
   forming a generally circular initial opening for said mouth during an initial stage of inflation of said main canopy by inflating a slider canopy which circumferentially and radially shapes said lower edge of said main canopy into said generally circular initial opening;
   providing an air flow path into said mouth for inflating said main canopy; and
   reefing said lower edge by slidingly engaging said suspension lines with a plurality of slider rings which are coupled to the slider canopy via a plurality of slider suspension lines at spaced locations around said slider canopy, wherein a first slider ring of the plurality of slider rings is configured to slide along a subset of the plurality of suspension lines, over a first convergence point, and along a first riser when the slider canopy descends from the parachute.

19. The method of claim 18, further comprising:
   generating radial tension in the plurality of slider suspension lines with said suspension lines; and
   in response to the radial tension, slidingly descending the slider canopy along said suspension lines.

20. The method of claim 18, wherein the air flow path is through a plurality of vents disposed in the slider canopy.

* * * * *